United States Patent [19]

Usui et al.

[11] Patent Number: 5,210,797
[45] Date of Patent: May 11, 1993

[54] ADAPTIVE DICTIONARY FOR A FINGERPRINT RECOGNIZER

[75] Inventors: Toshiyuki Usui; Saburou Kaneko, both of Tokyo, Japan

[73] Assignee: Kokusan Kinzoku Kogyo Kabushiki Kaisya, Tokyo, Japan

[21] Appl. No.: 605,541

[22] Filed: Oct. 29, 1990

[30] Foreign Application Priority Data

Oct. 30, 1989 [JP] Japan ................................. 1-279778
Apr. 27, 1990 [JP] Japan ............................. 2-44508[U]

[51] Int. Cl.⁵ .......................... G06K 9/00; G06K 9/62
[52] U.S. Cl. .................................... 382/4; 382/14; 382/30; 382/2
[58] Field of Search ................ 382/4, 50, 30, 2, 56, 382/14, 15, 65, 67

[56] References Cited

U.S. PATENT DOCUMENTS

| | | | |
|---|---|---|---|
| 3,891,968 | 6/1975 | McMahon | 382/4 |
| 4,504,970 | 3/1985 | Werth et al. | 382/14 |
| 4,537,484 | 8/1985 | Fowler et al. | 382/4 |
| 4,581,760 | 4/1986 | Schiller et al. | 382/4 |
| 4,724,542 | 2/1988 | Williford | 382/3 |
| 4,905,293 | 2/1990 | Asai et al. | 382/4 |

FOREIGN PATENT DOCUMENTS 0149777 6/1988 Japan ...................................... 382/4

Primary Examiner—David K. Moore
Assistant Examiner—Michael Cammarata
Attorney, Agent, or Firm—Bachman & LaPointe

[57] ABSTRACT

A method and apparatus for fingerprint recognition is provided in accordance with the present invention to achieve a higher rate of recognition by subsequently storing fingerprint patterns with higher rates of correspondence in place of fingerprint patterns already stored having low rates of correspondence.

7 Claims, 5 Drawing Sheets

[Data Registration]

[First Recognition After Data Registration]

[Second Recognition After Data Registration]

[Third Recognition After Data Registration]

\* Subsequent to the fourth recognition after data registration, input data is compared with the registered data (in areas 2, 3 and 4), and registered in an area with the lowest rate of correspondence.

ADAPTIVE DICTIONARY FOR A FINGERPRINT RECOGNIZER

BACKGROUND OF THE INVENTION

The present invention relates, in general, to fingerprint pattern recognition, and more particularly, to a method for fingerprint recognition with learning capability.

A fingerprint recognition apparatus is well known which recognizes a fingerprint pattern, stores the pattern in memory, and compares the subsequent entry of a fingerprint pattern with the stored fingerprint pattern to provide a correspondence signal when they correspond with each other.

For example, a fingerprint comparison apparatus is disclosed in Japanese Patent Publication No. 76964, 1988 wherein a fingerprint image to be checked is compared with a registered fingerprint image, said apparatus including a monitor which displays the fingerprint image of the finger to be compared and an indicator displaying a finger position guide on the monitor screen. Furthermore, in Japanese Patent Publication No. 149776, 1988, a fingerprint comparison apparatus is disclosed wherein a fingerprint is scanned several times for one finger at the fingerprint scanning section during fingerprint data registration and one piece of the data captured through several sessions of scanning is registered and stored as reference fingerprint data. In this fingerprint comparison system, other scanned data are compared with the reference fingerprint data to compute the rate of correspondence, which is registered and stored, whereupon the fingerprint scanned at the fingerprint scanning section is compared with said reference fingerprint data to determine the rate of correspondence, by means of which the correspondence of the scanned fingerprints is judged on the basis of whether or not the above rate of correspondence exceeds the reference level determined according to said registered and stored rate of correspondence.

In prior art fingerprint recognition apparatus, an optical signal of a fingerprint pattern is resolved into numerous segments, each of which is quantized into a binary signal, and it is determined whether the fingerprint pattern to be compared is the same as the registered fingerprint pattern according to the degree of correspondence between the segments based on said binary signal. However, it is difficult for the subject to press his or her fingerprint against the prism at a constant pressure or in a fixed direction. Therefore, even when the fingerprint pattern of a finger is registered in memory, the rate of correspondence between the registered fingerprint pattern and the subsequently entered fingerprint pattern is low, so that fingerprint patterns must be entered many times in order to be recognized correctly.

In this respect, the fingerprint comparison system disclosed in Japanese Patent Publication No. 149776, 1988 requires multiple entries of fingerprint data at the beginning of the finger recognition process. During this process, because only one piece of fingerprint data is registered and stored, and because the rate of correspondence is compared with reference to the single piece of fingerprint data registered, the disadvantage is that the frequency of correspondence between correct fingerprint data entered and the registered fingerprint data is significantly reduced when the accuracy of fingerprint comparison is enhanced. On the other hand, when the accuracy is reduced, the frequency of correspondence may increase, but erroneous recognition of fingerprint data will also increase. Since children's fingerprint patterns change significantly over short periods of time, the fingerprint comparison system disclosed in said Japanese Patent Publication has the disadvantage of failing to accurately recognize the fingerprints of growing children.

Accordingly, it is an object of the present invention to provide a method and apparatus for recognizing a fingerprint pattern whereby a high rate of recognition is achieved by memorizing with learning capability a new fingerprint pattern having a high rate of correspondence in place of a previously stored fingerprint pattern with a low rate of correspondence.

SUMMARY OF THE INVENTION

A method for fingerprint recognition according to the present invention comprises a step of receiving a fingerprint pattern of light beams reflected on a surface of a finger and storing each segment forming said fingerprint pattern of light beams in a memory, a step of comparing the segments of fingerprint pattern already stored in the memory with segments of a received fingerprint pattern so as to provide a correspondence signal when at least a predetermined number of segments correspond, a step of computing the rate of correspondence between the segments of the fingerprint pattern stored in the memory and the segments of said fingerprint pattern of light beams, and a step of storing the received fingerprint pattern in the memory in place of fingerprint pattern with a low rate of correspondence among the fingerprint patterns already stored in the memory.

The method for fingerprint recognition according to the present invention may include a step of switching the memory to the write mode and a step of switching the memory to the read mode, prior to the storing of each segment forming the fingerprint pattern of light beams into the memory.

The method for fingerprint recognition according to the present invention may also include a step of receiving a fingerprint pattern of light beams reflected on a surface of a finger and storing each segment forming the received fingerprint pattern of light beams in a first storage area of a memory, a step of comparing the segments of the fingerprint pattern already stored in the first storage area of the memory with segments of the fingerprint pattern received so as to provide a correspondence signal when at least a predetermined number of segments correspond, a step of storing a plurality of fingerprint patterns received in a second and subsequent storage areas of the memory, a step of computing the rate of correspondence between the segments of the fingerprint patterns stored in the second and subsequent storage areas of the memory and the segments of the received fingerprint pattern of light beams, and a step of storing the received fingerprint pattern in place of a fingerprint pattern with a low rate of correspondence among the fingerprint patterns already stored in the memory. The fingerprint pattern stored in the first storage area cannot be overwritten by a new fingerprint pattern.

The apparatus for fingerprint recognition according to the present invention includes a light source, a prism for receiving light beams from the light source as well as providing a positioning guide for a finger whose fingerprint is to be detected, a light receptor means for receiving the light reflected on a surface of a finger, converters for analog-to-digital (A/D) conversion of the output of the light receptor means, followed by binary quantization, an input memory for temporarily storing the output of the converters, a plurality of storage areas for storing respective fingerprint patterns captured from the surface of the same finger, a comparison judgment section for comparing the segments of the fingerprint pattern transferred from the input memory via a registration switch with segments of the fingerprint patterns stored in the storage areas so as to generate a correspondence signal when at least a predetermined number of segments forming the fingerprint patterns correspond, and a re-registration area judgment section for computing the rate of correspondence of the segments based on the correspondence signal from the comparison judgment section and storing the compared fingerprint pattern in place of a fingerprint pattern with a lower rate of correspondence among the fingerprint patterns stored in the storage areas.

The apparatus for fingerprint recognition further comprises a finger-positioning base wherein the finger-positioning base includes: a base frame having a pair of guides arranged adjacently and practically parallel to a second surface of a transparent member having a first surface arranged adjacently to a light source, the pair of guides forming a clearance; and a reference member which is arranged between said guides and practically normal thereto, so that it can be brought into contact with a first joint of a finger of a subject at the time of fingerprint recognition.

The base frame is practically inversely U-shaped.

A groove is formed practically parallel to the guides in an intermediate section connecting the guides of the base frame.

More specifically, the light emitted from a light source passes through a prism and strikes a finger by which the light is reflected and then received by a light receptor means. The fingerprint pattern of light beams reflected on a surface of the finger is received by the light receptor means, and each segment forming the fingerprint pattern of light beams is stored in a memory. The output of the light receptor means is converted from analog to digital form by a converter and then quantized before being temporarily stored in an input memory. When a registration switch is shifted to the write mode, the fingerprint pattern stored in the input memory is written into a first storage area. Subsequently, the registration switch is shifted to the read mode. Therefore, after the fingerprint pattern received by the light receptor means is stored in the input memory, the comparison judgment section compares the segments of the fingerprint pattern transferred from the input memory via the registration switch with segments of the fingerprint pattern stored in the storage area so as to generate a correspondence signal when at least a predetermined number of segments forming the fingerprint patterns correspond. At the same time, subsequent fingerprint patterns are stored in a second and subsequent storage areas. When fingerprint patterns are stored in all of the storage areas, the re-registration area judgment section computes the rate of correspondence between the segments based on the correspondence signal from the comparison judgment section and storing the compared fingerprint pattern in a storage area other than the first storage area in place of a fingerprint pattern with a lower rate of correspondence among the fingerprint patterns stored in the storage areas.

DETAILED DESCRIPTION OF THE INVENTION

Figure 1:
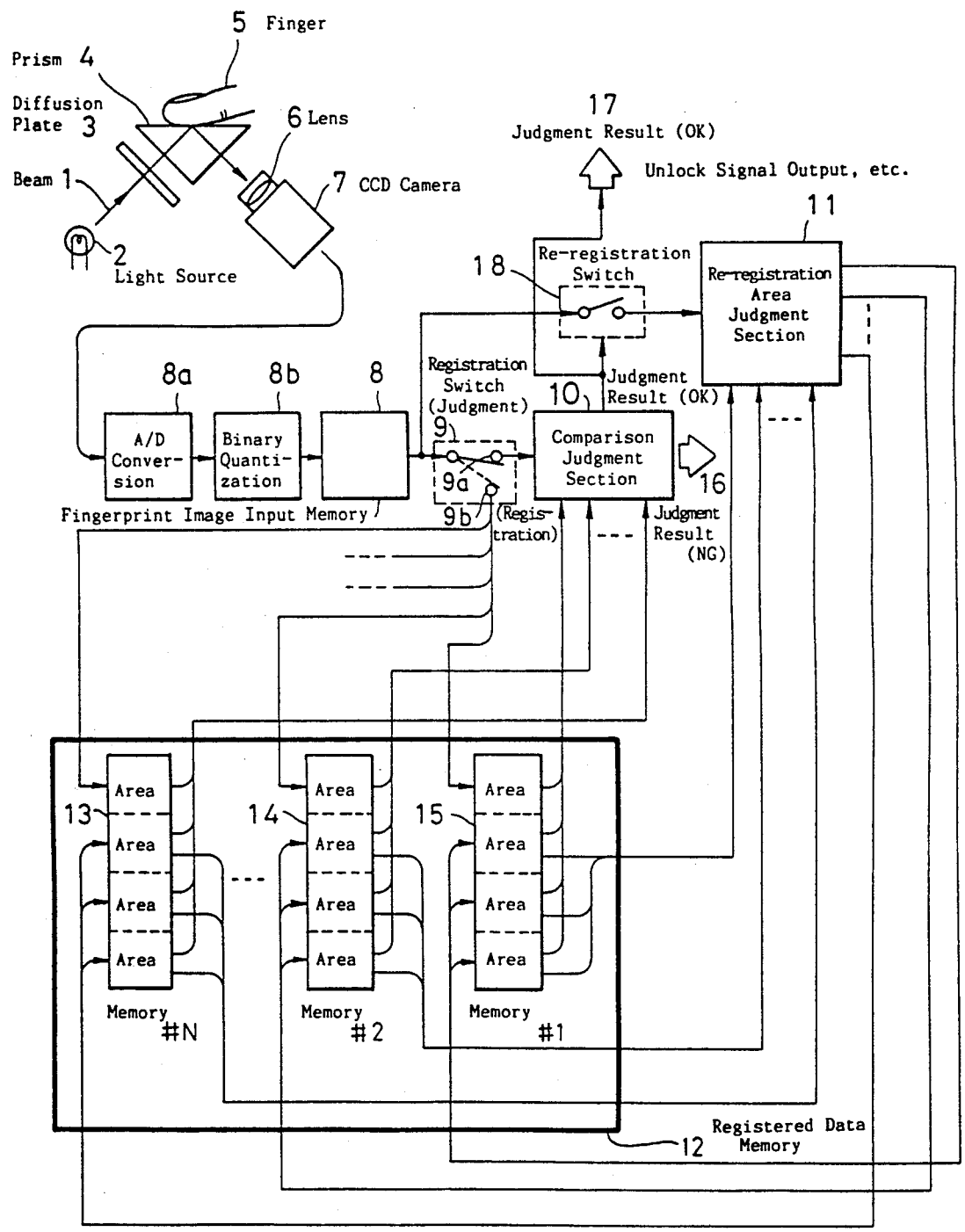
FIG. 1 is a block diagram illustrating the configuration of an apparatus for fingerprint recognition according to the present invention.
Figure 2:
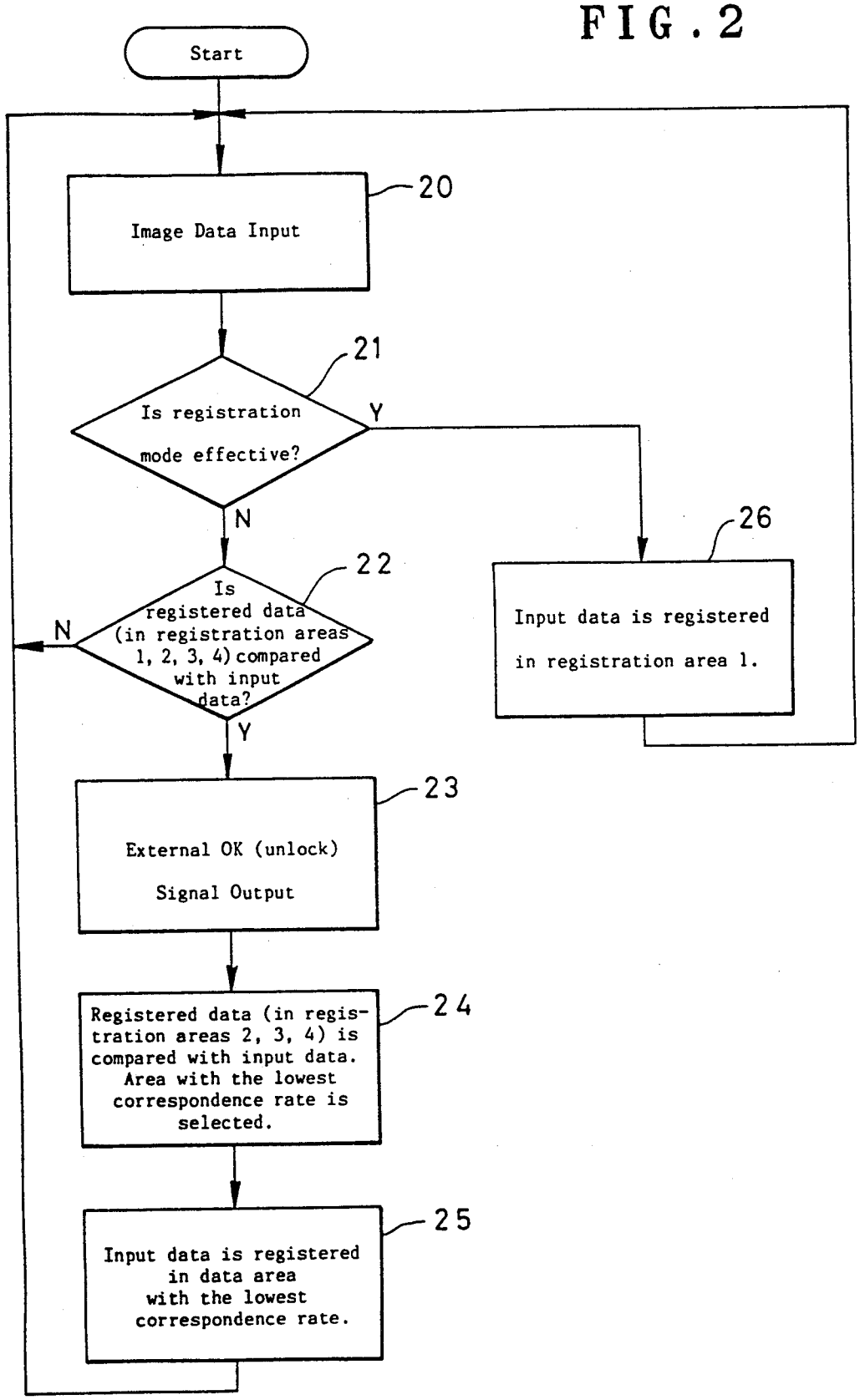
FIG. 2 is a flowchart illustrating a sequence of actions performed by the apparatus for fingerprint recognition of FIG. 1.

Referring to FIGS. 1 through 3, an embodiment of the present invention is described wherein the present invention is applied to a fingerprint lock system.

As shown in FIG. 1, the fingerprint recognition apparatus has light source 2 and prism 4 which receives light beam 1 sent from light source 2 via diffusion plate 3. Finger 5 whose fingerprint is to be detected is placed on prism 4. Light beam 1 reflected on a surface of finger 5 is received, through lens 6, by CCD camera 7 which serves as a light receptor means. After analog-to-digital (A/D) conversion by A/D converter 8a, the output of CCD camera 7 is quantized by BCD converter 8b, whose output is stored in input memory 8.

If registration switch 9 has been switched to contact 9b, fingerprint information stored in input memory 8 is registered in memory 12. Registration data memory 12 has n storage areas 13, 14, and 15 having memories #1 through #N. The first fingerprint information to be registered is stored in a first storage area of memory #1. After the information is stored in first storage area 1, registration switch 9 is switched to contact 9a. Comparison judgment section 10 is connected to input memory 8 via memory 12 and registration switch 9. The output from input memory 8 is connected to re-registration area judgment section 11 via re-registration switch 18. Re-registration switch 18 comprises switching elements within ICs. The output from comparison judgment section 10 is connected to OK (approve) display section 17 which sends a correspondence signal as an unlock signal to a fingerprint lock mechanism and re-registration switch 18 when the fingerprint patterns agree with each other and to NG (disapprove) display section 16 which sends a non-correspondence signal when the fingerprint patterns disagree. Re-registration area judgment section 11 is connected to a second and subsequent storage areas of memories #1 through #N.

In the above architecture, comparison judgment section 10, re-registration area judgment section 11, and memory 12 are operated in accordance with the operating sequence shown in FIG. 2.

Referring to FIG. 2, the operation proceeds from Start to Step 20, where image data is entered. As shown in FIG. 1, image data is entered by having finger 5 placed on the upper surface of prism 4. Therefore, light beam 1 emitted from light source 2 is passed through diffusion plate 3 into prism 4. Light beam 1 passing through prism 4 is reflected on a surface of finger 5 and passed again through prism 4 and lens 6, and then received by CCD camera 7. The received light beam 1 is first A/D converted by A/D converter 8a and quantized by BCD converter 8b, whose output is stored in input memory 8.

Next, the operation proceeds to Step 21, where it is decided whether or not the registration mode is effective. In the registration mode, registration switch 9 has been set to contact 9b. Therefore, in Step 21, if confirmed by Yes, the operation proceeds to Step 26, where the data is fed to first registration area 1 of memory #1 whereupon the operation returns to Step 20. As shown in FIG. 3 A, the fingerprint information is stored in first memory area 1 of memory #1. Although not illustrated in detail, the fingerprint pattern consists of numerous quantized segments.

Figure 3A:
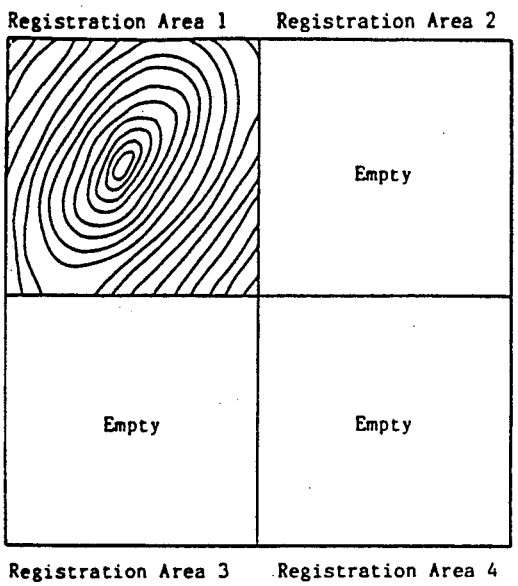
FIG. 3A, FIG. 3B, FIG. 3C, and FIG. 3D show a sequence of fingerprint patterns to be stored in their respective registration areas of the memory shown in FIG. 1.
Figure 3B:
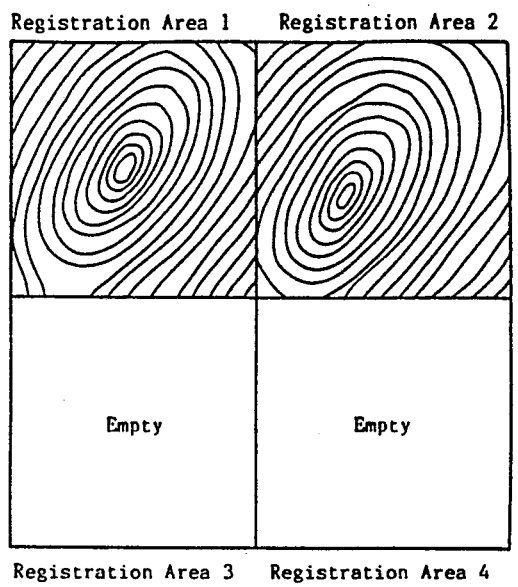

In Step 21, when the registration mode is not effective, that is, registration switch 9 is switched to contact 9a, the fingerprint pattern entered in input memory 8 is compared with fingerprint patterns stored in all of the storage areas of memory 12 (Step 22). The segments of the fingerprint pattern sent from input memory 8 to comparison judgment section 10 are compared with segments of fingerprint patterns stored in storage areas by comparison judgment section 10, which generates a correspondence signal when at least a predetermined number of segments forming the fingerprint patterns correspond, whereupon the correspondence signal is sent to OK display section 17 and re-registration switch 18 (Step 23). Therefore, re-registration switch 18 is turned on. On the other hand, if more than the predetermined number of segments do not correspond in Step 22, comparison judgment section 10 sends an output signal to NG display section 16, and the operation returns to Step 20. After OK display section 17 is activated in Step 23, a subsequent fingerprint pattern is passed through re-registration switch 18 and re-registration area judgment section 11 and stored, as supplementary fingerprint data for first registration area 1 where the fingerprint patterns have been matched, in a second registration area 2, or one of storage areas 13, 14, and 15 that forms the same line with the first registration area. In Step 24, an unregistered registration area is judged as a registration area when the correspondence rate is zero. FIG. 3B shows a state where a fingerprint pattern has been registered in second registration area 2. Re-registration area judgment section 26 computes and stores the rate of correspondence for fingerprint patterns to be registered and the rate of correspondence with the segments forming the fingerprint patterns stored in their respective registration areas in accordance with the correspondence signal from comparison judgment section 10.

Figure 3C:
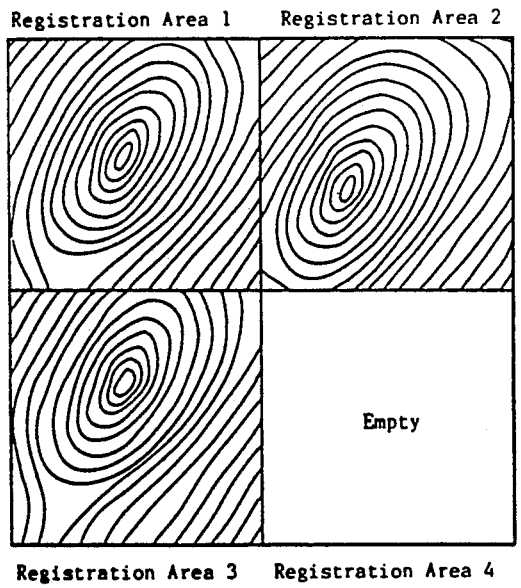
Figure 3D:
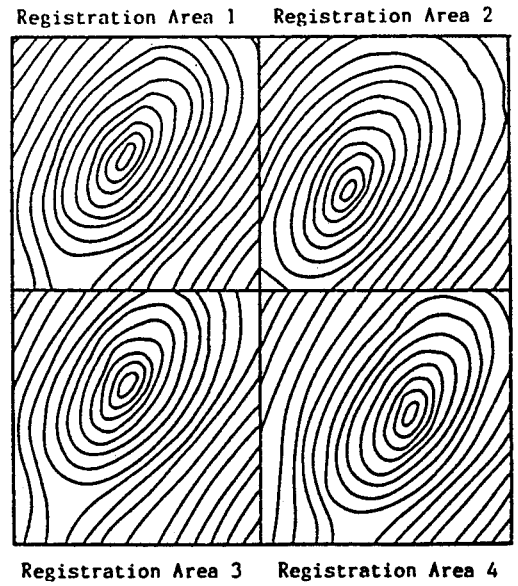

In a similar manner, subsequent fingerprint patterns are registered as supplementary fingerprint data in third registration area 3 and fourth registration area 4. FIGS. 3C and 3D show states where fingerprint patterns have been registered in the third and fourth registration areas, respectively. In this way, when fingerprint information is registered in second registration area 2 through fourth registration area 4, the segments of all the fingerprint patterns registered in second registration area 2 through fourth registration area 4 are compared with the segments of a newly entered fingerprint pattern, thus enabling the correspondence rate to be improved.

When the first through fourth registration areas have been filled and a new fingerprint pattern is entered, re-registration area judgment section 11 selects a registration area containing a fingerprint pattern with the lowest correspondence rate among the fingerprint patterns stored in storage areas 2 through 4 (Step 24). Subsequently, re-registration area judgment section 11 stores the new fingerprint pattern in place of the preregistered fingerprint pattern in the storage area having the lowest correspondence rate (Step 25).

In the above embodiment of the present invention, the fingerprint of the same finger can be stored as a plurality of fingerprint patterns, so that when one fingerprint pattern entered is to be checked it can be compared with a plurality of correct fingerprint patterns registered and a fingerprint pattern containing segments with a higher rate of correspondence can be registered in place of a fingerprint pattern with a lower rate of correspondence, thus permitting the rate of correspondence to be improved without any compromise in comparison accuracy. Even for a finger of a growing child whose fingerprint pattern changes significantly over short periods of time, its fingerprint can be recognized correctly by means of the learning capability.

Figure 4:
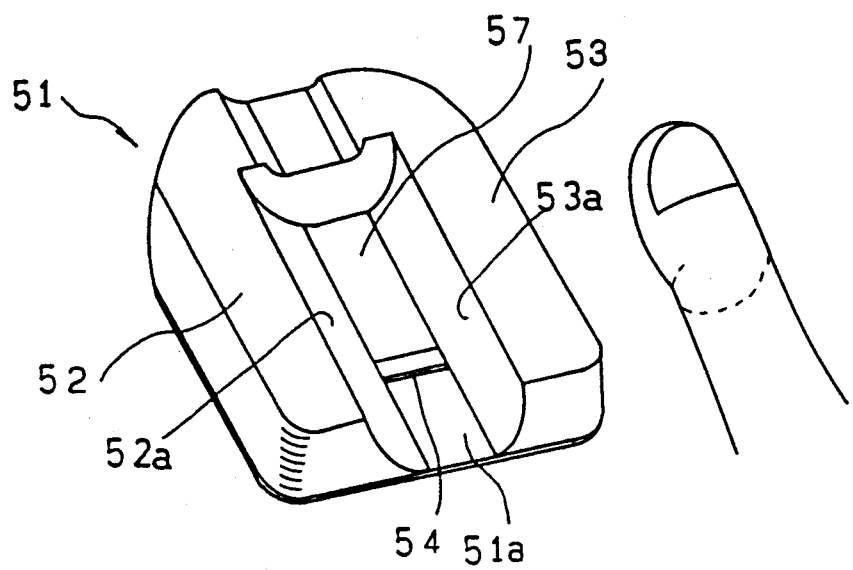
FIG. 4 is a perspective view illustrating a finger-positioning base for an apparatus for fingerprint recognition according to the present invention.

As shown in FIG. 4, a finger-positioning base includes base frame 51 having a pair of guides 52 and 53, and a reference member 54 arranged between guides 52 and 53. Base frame 51 is practically inversely U-shaped. Arc-shaped inner surfaces 52a and 53a are located inside guides 52 and 53. Reference member 54 which can be brought into contact with a first joint of a finger of a subject at the time of fingerprint recognition is arranged practically normal to guides 52 and 53 and under inner surfaces 52a and 53a. Reference member 54 may be molded integrally with or separately from guides 52 and 53 by use of any appropriate material. In one embodiment shown in the figure, reinforcement 51a is placed on a rear surface of reference member 54.

Figure 5:
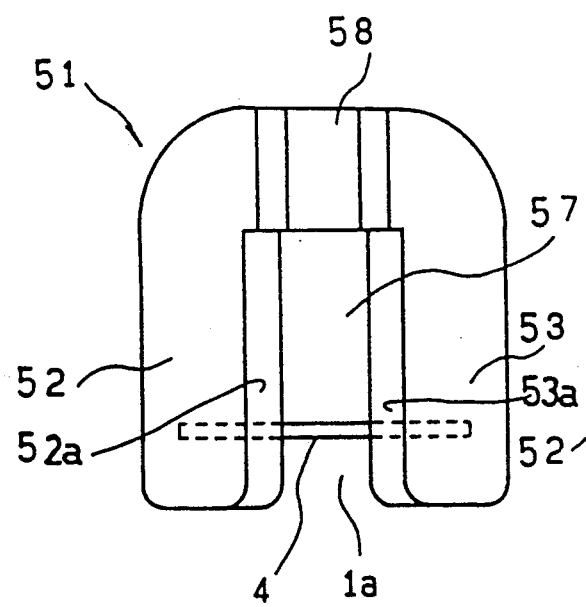
FIG. 5 is a plan view illustrating the same.
Figure 6:
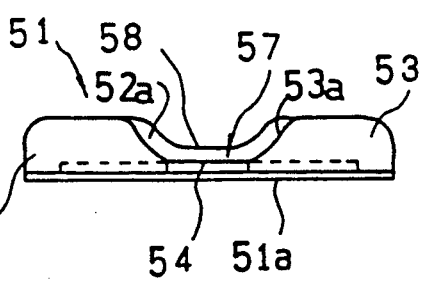
FIG. 6 is a side view illustrating the same.
Figure 7:
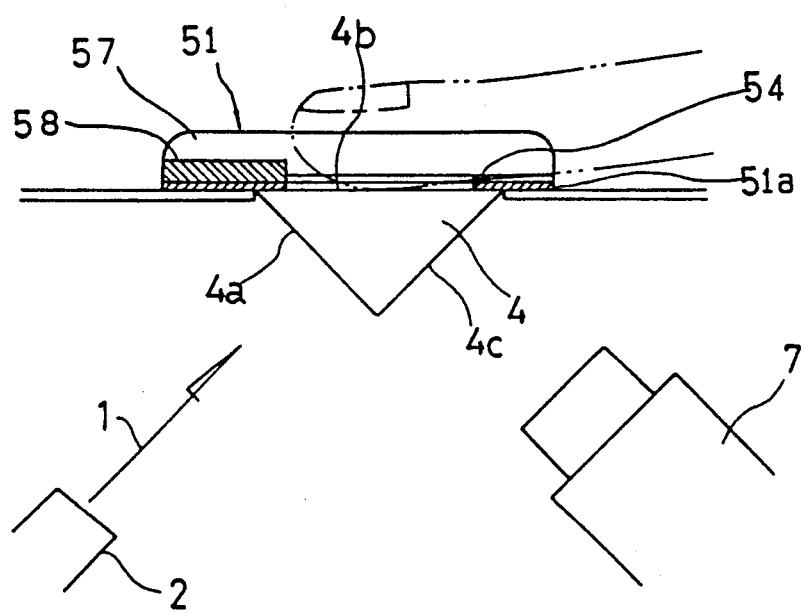
FIG. 7 is a cross-sectional view illustrating a finger placed on the same.
Figure 8:
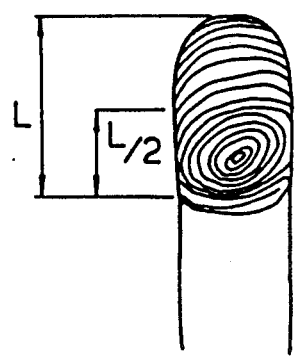
FIG. 8 is a partial front view of a finger.

As shown in FIG. 5, a pair of guides 52 and 53 are arranged adjacently and practically parallel to a second surface of prism 4 which is made of a transparent material having first surface 4a arranged parallel to light source 2 so as to form clearance 57. Groove 58 is formed practically parallel to guides 52 and 53 in an intermediate section connecting guides 52 and 53 of base frame 51 in order to avoid contact with a fingernail of a subject.

When a finger of a subject is placed on clearance 57 between a pair of guides 52 and 53 at the time of fingerprint recognition, a lateral position of the finger is automatically determined so that a characteristic area of the fingerprint can be optically scanned. When a first joint of the finger is brought into contact with reference member 54, a longitudinal position thereof is automatically determined. Therefore, the finger-positioning base according to the present invention permits the finger-positioning location and angle to be virtually fixed at all times, thus improving fingerprint recognition accuracy. Under such conditions, light emitted from light source 2 is passed from first surface 4a through prism 4 and reflected on a surface of a finger via second surface 4b. A fingerprint pattern of light beams reflected on the surface of the finger is passed from third surface 4c and received by CCD camera 7. Each segment forming a fingerprint pattern of light beams received by CCD camera 7 is stored in memory.

It is evident that various modifications can be made to the above embodiment of the present invention. For example, registration areas in any number of lines can be provided in the memory. Although in the above embodiment, the present invention has been applied to a fingerprint lock system, it will be understood that the present invention can also be applied to any entry/exit control system in addition to a fingerprint lock system.

We claim:

1. A method for fingerprint recognition including a registration means having a write mode and a read mode comprising the steps of:

receiving an initial fingerprint pattern of light beams reflected on a surface of a finger;

storing said initial fingerprint pattern in a first storage area of a plurality of storage areas within a memory when said registration means is in the write mode;

receiving a second fingerprint pattern of light beams reflected on the surface of the finger when said registration means is in the read mode;

comparing segments of fingerprint pattern already stored with segments of the second fingerprint pattern when said registration switch is in the read mode;

providing a correspondence signal when at least a predetermined number of segments correspond;

storing said segments of the second fingerprint pattern in a second storage area of the memory;

computing the number of occurrences of correspondence between the segments of fingerprint pattern stored in the memory and the segments of the second fingerprint pattern;

receiving a third fingerprint pattern of light beams reflected on the surface of the finger when said registration switch is in the read mode;

comparing the segments of fingerprint pattern already stored in the storage areas of the memory with segments of the third fingerprint pattern;

providing a correspondence signal when at least a predetermined number of segments correspond; and storing the third fingerprint pattern in the memory in place of a fingerprint pattern with the lowest number of occurrences of correspondence among the fingerprint patterns already stored in the registration areas of the memory whereby all of the storage areas store different fingerprint patterns.

2. A method for fingerprint recognition of claim 1 further comprising a reregistration means and energizing said reregistration means to effect storage of said segments of fingerprint patterns in one of the storage areas of the memory.

3. A method for fingerprint recognition of claim 1 wherein the fingerprint pattern stored in the first storage area is not overwritten by a new fingerprint pattern.

4. A method for fingerprint recognition of claim 1, said memory including at least four storage areas for storing different fingerprint patterns for the same fingerprint.

5. A method according to claim 1 plus the step of discarding the fingerprint pattern which has the lowest number of occurrences of correspondence among the fingerprint patterns stored in said plurality of storage areas whereby the record and quality of the fingerprint of the finger is updated.

6. In an apparatus for fingerprint recognition including a light source; a prism for receiving the light from the light source as well as providing a positioning guide for a finger whose fingerprint is to be detected; a light receptor means for receiving the light reflected on a surface of a finger; a converter for analog-to-digital conversion of output from the light receptor means followed by binary quantization;

the improvement comprising:

a memory including a plurality of storage areas, each of which stores a fingerprint pattern captured from the surface of the same finger;

a registration switch for changing said memory into write or read mode and for storing an initial fingerprint pattern in a first storage area of the memory only when the registration switch is in the write mode;

a comparison judgment section for comparing segments of fingerprint pattern forwarded through said registration switch in the read mode with segments of fingerprint pattern stored in at least one of the storage areas of said memory, and for providing a correspondence signal when at least a predetermined number of segments correspond; and a reregistration area judgment section for computing the rate of correspondence based on the correspondence signal from the comparison judgment section, storing said segments of the subsequent fingerprint pattern in another storage area of the memory, and storing the subsequent fingerprint pattern in the memory in place of a fingerprint pattern with the lowest rate of correspondence among the fingerprint patterns already stored in the registration areas of the memory after all of the storage areas store different fingerprint patterns and when said registration switch is in the read mode.

7. The apparatus of claim 6 further comprising an input memory for storing the output of the converter temporarily and for supplying the segments of fingerprint pattern to said comparison judgment section.

* * * * *